(12) United States Patent
Liu et al.

(10) Patent No.: US 11,703,390 B2
(45) Date of Patent: Jul. 18, 2023

(54) CIGARETTE TEMPERATURE DETECTION DEVICE AND METHOD

(71) Applicant: CHINA TOBACCO YUNNAN INDUSTRIAL CO., LTD, Kunming (CN)

(72) Inventors: Ze Liu, Kunming (CN); Yuanzhen Zhou, Kunming (CN)

(73) Assignee: CHINA TOBACCO YUNNAN INDUSTRIAL CO., LTD, Kunming (CN)

( * ) Notice: Subject to any disclaimer, the term of this patent is extended or adjusted under 35 U.S.C. 154(b) by 0 days.

(21) Appl. No.: 17/802,537

(22) PCT Filed: Dec. 22, 2021

(86) PCT No.: PCT/CN2021/140303
§ 371 (c)(1),
(2) Date: Aug. 26, 2022

(87) PCT Pub. No.: WO2023/024358
PCT Pub. Date: Mar. 2, 2023

(65) Prior Publication Data
US 2023/0194352 A1 Jun. 22, 2023

(30) Foreign Application Priority Data
Aug. 26, 2021 (CN) .......................... 202110985819.8

(51) Int. Cl.
*G01J 5/0806* (2022.01)
*G02B 27/09* (2006.01)
*G01J 5/00* (2022.01)
*G01J 5/08* (2022.01)

(52) U.S. Cl.
CPC .......... *G01J 5/0806* (2013.01); *G01J 5/0014* (2013.01); *G01J 5/0879* (2022.01); *G02B 27/0966* (2013.01)

(58) Field of Classification Search
CPC ...... G01J 5/0806; G01J 5/0014; G01J 5/0879; G02B 27/0966
See application file for complete search history.

(56) References Cited

U.S. PATENT DOCUMENTS
2019/0098934 A1    4/2019   Szabo et al.

FOREIGN PATENT DOCUMENTS

| CN | 103604505 A | 2/2014 |
| CN | 207502067 U | 6/2018 |
| CN | 113180313 A | 7/2021 |
| CN | 113804304 A | 12/2021 |
| JP | 2001333758 A | 12/2001 |

*Primary Examiner* — David P Porta
*Assistant Examiner* — Gisselle M Gutierrez
(74) *Attorney, Agent, or Firm* — Bayramoglu Law Offices LLC

(57) ABSTRACT

A cigarette temperature detection device including multiple cylindrical convex lenses is provided, wherein each of the cylindrical convex lenses has a thicker central wall between two thinner end walls formed by rotating a parallel line at a predetermined distance around a long axis of an elliptical-like section resulting from cutting the circular convex lens by a plane perpendicular to a centerline. The disclosed cigarette temperature detection device allows accurate and reliable detection of a temperature of an entire circumferential surface of a cigarette on site.

16 Claims, 3 Drawing Sheets

CIGARETTE TEMPERATURE DETECTION DEVICE AND METHOD

CROSS REFERENCES TO THE RELATED APPLICATIONS

The application is the national phase entry of International Application No. PCT/CN2021/140303, filed on Dec. 22, 2021, which is based on and claims priority on Chinese patent application No. 202110985819.8, filed on Aug. 26, 2021, the entire contents of which are incorporated herein by reference.

TECHNICAL FIELD

The present disclosure belongs to the technical field of tobacco and, in particular, to a cigarette temperature detection device and method.

BACKGROUND

In a cigarette production process, the cigarette paper wrapping shredded tobacco is glued and dried with a heater to form cigarettes. The cigarettes are continuously output by the cigarette gun, and then, they are weighed, cut, and attached with filter tips to become finished cigarettes.

At present, the cigarettes output by the cigarette gun are tested only for weight or density. In fact, the moisture content of the shredded tobacco in the cigarette and the temperature of the heater have a significant impact on the quality of the finished cigarettes. To determine the temperature of the finished cigarettes, it is necessary to determine whether the temperature setting of the heater of each cigarette roller is consistent and whether the heat transfer rate between the heating tube and the heater is consistent. In addition, since the contact distance between the cigarette and the heater may be different, it is also necessary to determine whether the heat transfer amount between the heater and the cigarette is consistent.

Differences in the above factors will affect the smoking quality of the finished cigarettes, and the quality of the same type of cigarettes produced by different machines or at different times of the same machine will also vary. Therefore, it is important to detect the temperature of the cigarettes during the production process. In particular, the effective detection of the temperature of the cigarettes can reduce quality problems caused by wrapping of the cigarettes. With the improvement of the quality requirements of cigarettes, in order to ensure the stability and uniformity of the quality of the finished cigarettes, the cigarettes output by the cigarette gun of the cigarette roller require accurate detection and control of more parameters, especially the temperature.

The production of cigarettes is carried out continuously. During the continuous and rapid forward transport of the cigarette, different temperature distributions will be formed around the circumference of the cigarette according to the position where the wrapping of the cigarette contacts the heater. In the prior art, the temperature of the cigarette in the cigarette roller can only be detected manually by using an infrared planar imaging thermometer or a point and shoot infrared temperature gun. However, the cigarette is cylindrical, and planar imaging can only detect the temperature of a part of the surface of the cigarette. As a result, the detection of the temperature of the entire circumferential surface of the cigarette is inaccurate.

The disclosure hereby proposes a solution(s) to solve the aforementioned problems.

SUMMARY

The present disclosure provides a cigarette temperature detection device and method. The cigarette temperature detection device of the present disclosure adopts a ring temperature measurement method to detect the temperature of each position on an entire circumferential surface of a cigarette and calculate an average temperature of a 360° ring line on the circumferential surface of the cigarette. In addition, the cigarette temperature detection device can detect the temperature of the entire circumferential surface of a cigarette that is transported continuously at a uniform speed for a period of time. The cigarette temperature detection device can accurately detect the temperature of the entire circumferential surface of the cigarette and accurately control the temperature setting of a heater according to the measurement result, thereby realizing stable control of the quality of the cigarette.

The present disclosure adopts the following technical solutions:

A first aspect of the present disclosure provides a cigarette temperature detection device. The cigarette temperature detection device includes multiple cylindrical convex lenses, where each of the cylindrical convex lenses has a thicker central wall between two thinner end walls and is formed by rotating along a parallel line at a certain distance around a long axis of an approximately elliptical section formed by cutting the circular convex lens by a plane perpendicular to a centerline.

Preferably, the multiple cylindrical convex lenses may be specifically two or more cylindrical convex lenses, which may be coaxially nested together, and the cylindrical convex lenses each may be a biconvex lens or a planoconvex lens with a radius of curvature of 2-60 mm.

Preferably, the multiple cylindrical convex lenses may be specifically three cylindrical convex lenses, namely a first cylindrical convex lens T1, a second cylindrical convex lens T2, and a third cylindrical convex lens T3, which may be arranged from inside to outside, respectively. The first cylindrical convex lens T1, the second cylindrical convex lens T2, and the third cylindrical convex lens T3 have an inner diameter of 7-15 mm, 15-60, and 20-120 mm, respectively.

Preferably, the cigarette temperature detection device further may include a cylindrical grating S and a cylindrical infrared detector D. The cylindrical grating S may be sleeved outside the multiple cylindrical convex lenses, and the cylindrical infrared detector D may be sleeved outside the cylindrical grating S, such that the cylindrical infrared detector D may be located on a focus ring of the multiple cylindrical convex lenses. The multiple cylindrical convex lenses, the cylindrical grating S, and the cylindrical infrared detector D may be coaxial.

Preferably, the cylindrical grating S has an inner diameter that may be 1 mm or more larger than an outer diameter of an outermost cylindrical convex lens. The cylindrical infrared detector D has an inner diameter that may be 1 mm or more larger than an outer diameter of the cylindrical grating S.

Preferably, the cylindrical infrared detector D uses a 5-10 μm infrared ray for temperature measurement.

Preferably, the cigarette temperature detection device further may include an inner shell Kn and an outer shell Kw of a cigarette channel. The inner shell Kn of the cigarette channel may be nested inside an innermost cylindrical convex lens and may be coaxial with the cylindrical convex lenses, the cylindrical grating S, and the cylindrical infrared detector D. The outer shell Kw of the cigarette channel may surround the cylindrical infrared detector D.

Preferably, the cylindrical convex lenses and the inner shell Kn of the cigarette channel may be made of one of the materials in the group consisting of far-infrared quartz glass, infrared-permeable polycarbonate PC, transparent acrylic, other transparent resin, and 8-14 µm silicon lens. The cylindrical grating may be a special grating for an infrared imager, and the cylindrical infrared detector may be made of amorphous silicon.

A second aspect of the present disclosure provides a cigarette temperature detection method, which uses the cigarette temperature detection device and includes the following steps:

inserting a cigarette output by a cigarette gun of a cigarette roller into the inner shell Kn of the cigarette channel; focusing, by the cylindrical convex lenses, an infrared ray on a 360° ring line on a circumferential surface of the cigarette; isolating, by the cylindrical grating S, interfering light, and projecting the 5-10 µm infrared ray onto the cylindrical infrared detector D to form a focus ring; taking multiple temperature measurement points evenly on the focus ring; and processing to acquire an average temperature of the 360° ring line on the circumferential surface of the cigarette; and measuring, by the cylindrical infrared detector D of the cigarette temperature detection device, a temperature of an entire circumferential surface of a cigarette that is transported continuously at a constant speed in a period of time, which is in the form of a continuous focus ring; selecting a ring line of the focus ring with a frequency of not less than 1 frame per 12 seconds for temperature measurement; and processing to acquire a continuous average temperature curve, which shows the temperature of the entire circumferential surface of the continuous cigarette in a period of time.

The present disclosure has the following beneficial effects:
1. The present disclosure constructs the cylindrical convex lenses for use in the cigarette temperature detection device for the first time and designs the cigarette temperature detection device based on the cylindrical convex lenses. The present disclosure achieves accurate and reliable detection, which provides an effective means for accurate detection of the temperature of the circumferential surface of the cigarette, and fills in the technology gap of the detection of the temperature of the entire circumferential surface of the cigarette on site.
2. Based on the principle and structure of the cigarette temperature detection device of the present disclosure, products and designs suitable for circumferential surface temperature detection of ring products such as food, cylindrical fluids, and flowing bars can be developed. Therefore, the present disclosure has obvious application prospects.

Figure 1:
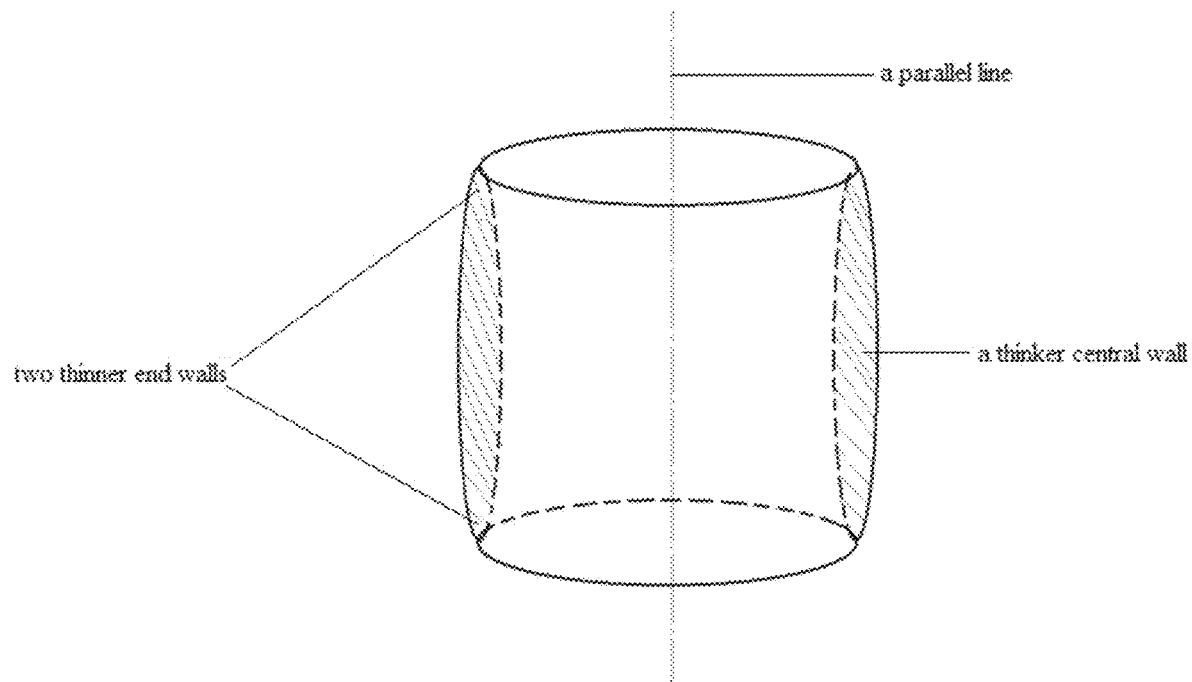
FIG. 1 is a perspective view of a cylindrical convex lens according to the present disclosure.

Reference Numerals: Kn. inner shell of the cigarette channel; Kw. outer shell of the cigarette channel; T1. first cylindrical convex lens; T2. second cylindrical convex lens; T3. third cylindrical convex lens; S. cylindrical grating; and D. cylindrical infrared detector.

DETAILED DESCRIPTION OF THE EMBODIMENTS

In order to make the structural features and effects of the present disclosure further understood, the present disclosure is described in detail below with reference to the embodiments and the drawings.

Figure 3:
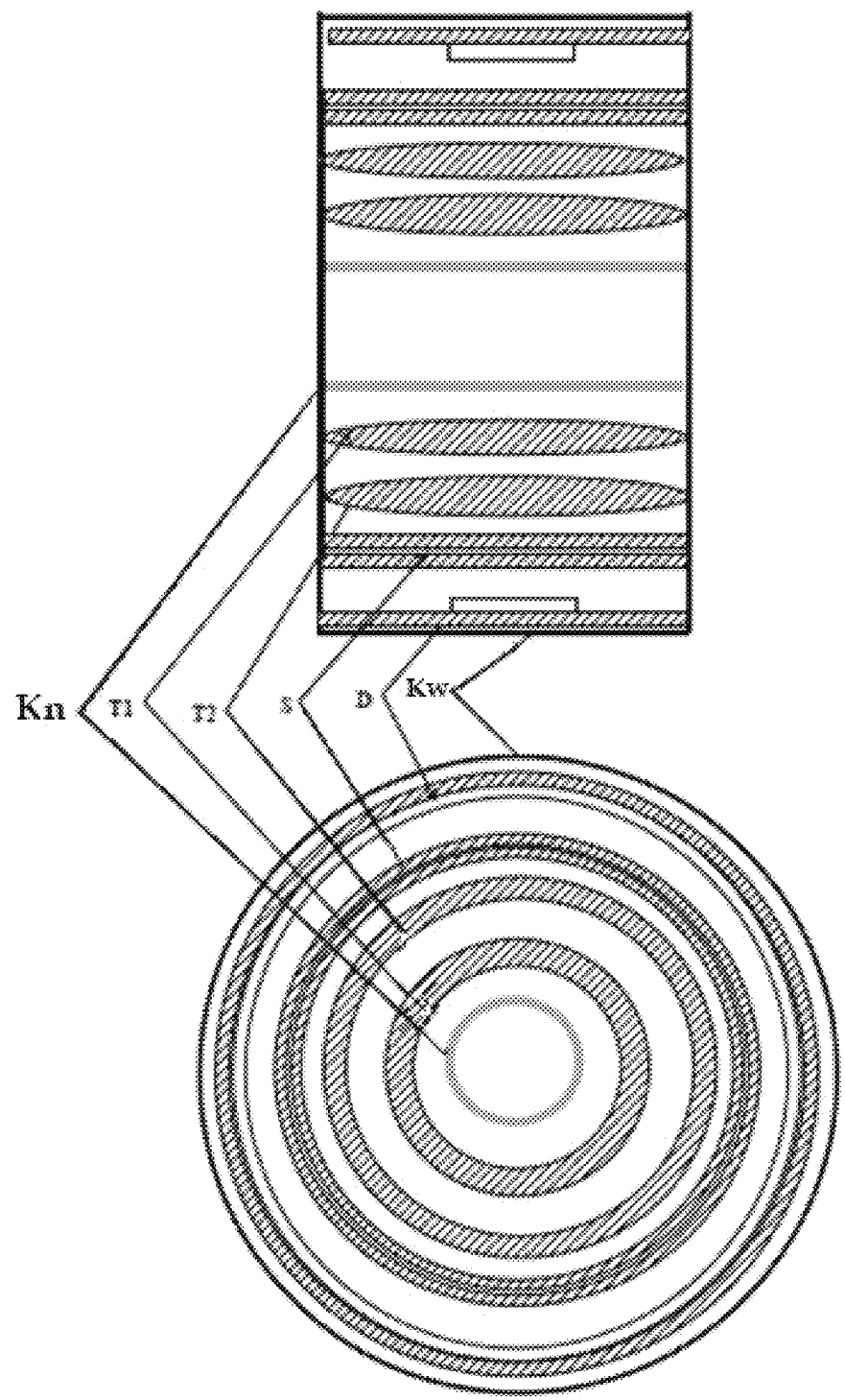
FIG. 3 is an axial sectional view (top) of the cigarette temperature detection device along a central axis of the cylindrical convex lens and a radial sectional view (bottom) of the cigarette temperature detection device perpendicular to the central axis of the cylindrical convex lens according to the present disclosure.

The present disclosure provides a cigarette temperature detection device. FIG. 3 is an axial sectional view (top) of the cigarette temperature detection device along a central axis of a cylindrical convex lens and a radial sectional view (bottom) of the cigarette temperature detection device perpendicular to the central axis of the cylindrical convex lens. The cigarette temperature detection device includes an inner shell Kn of a cigarette channel, a first cylindrical convex lens T1, a second cylindrical convex lens T2, a third cylindrical convex lens T3, a cylindrical grating S, and a cylindrical infrared detector D.

In an embodiment, the two cylindrical biconvex lenses, namely the first cylindrical convex lens T1 and the second cylindrical convex lens T2 are coaxially nested together from inside to outside, respectively. The first cylindrical convex lens T1 has an inner diameter of 12 mm and an outer diameter of 19.6 mm. The second cylindrical convex lens T2 has an inner diameter of 20 mm and an outer diameter of 27.6 mm. The two cylindrical convex lenses each have a radius of curvature of 25 mm.

Figure 2:
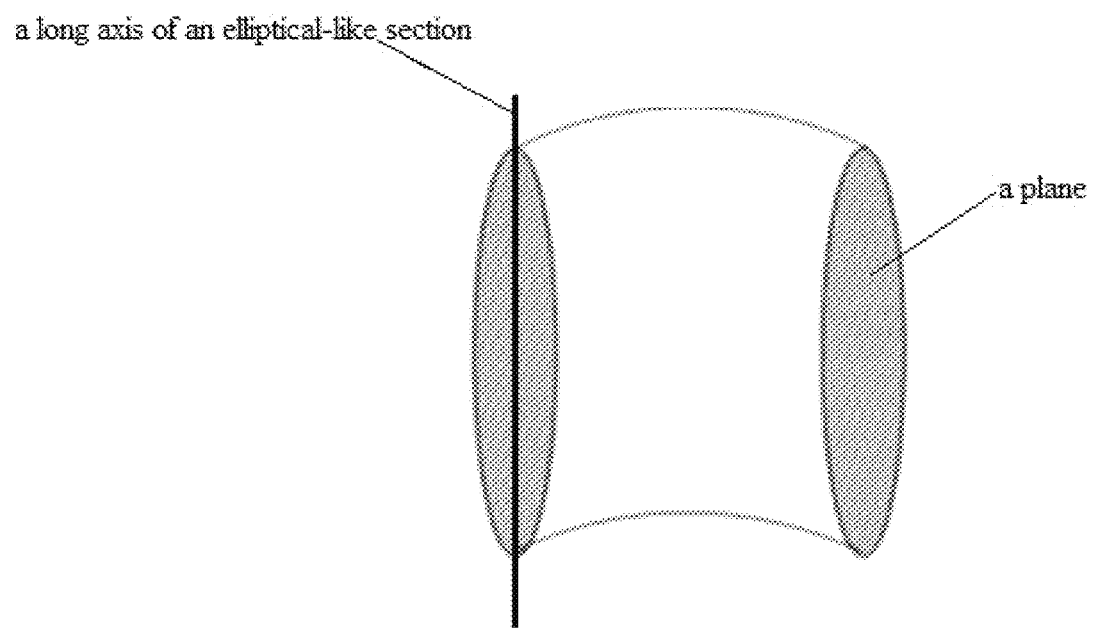
FIG. 2 is an axial sectional view of the cylindrical convex lens according to the present disclosure.

The cylindrical convex lens is shown in FIGS. 1 and 2. The cylindrical convex lens has a thicker central wall between two thinner end walls and is formed by rotating along a parallel line at a certain distance around a long axis of an approximately elliptical section formed by cutting the circular convex lens by a plane perpendicular to a centerline.

As shown in FIG. 3, the second cylindrical convex lens T2 is surrounded by the cylindrical grating S, which is configured to isolate interference light. The cylindrical grating S has an inner diameter of 89.6 mm and an outer diameter of 90.6 mm. The cylindrical grating S is surrounded by the cylindrical infrared detector D. The cylindrical infrared detector D has an inner diameter of 95.6 mm and an outer diameter of 97.6 mm. The cylindrical grating S is sleeved outside the two cylindrical convex lenses, and the cylindrical infrared detector D is sleeved outside the cylindrical grating S. The two cylindrical convex lenses, the cylindrical grating, and the cylindrical infrared detector are coaxial. The cylindrical infrared detector D is located on a focus ring of the cylindrical convex lenses. The inner shell Kn of the cigarette channel is nested inside the innermost cylindrical convex lens and is coaxial with the two cylindrical convex lenses, the cylindrical grating, and the cylindrical infrared detector. The inner shell Kn of the cigarette channel has an inner diameter of 10 mm and an outer diameter of 11 mm. An outer shell Kw of the cigarette channel surrounds the cylindrical infrared detector.

In the present disclosure, the temperature measurement is performed by a 10 μm infrared ray. The inner shell Kn of the cigarette channel, the first cylindrical convex lens T1, the second cylindrical convex lens T2, the cylindrical grating S, and the cylindrical infrared detector D each have a length of 30 mm. The cigarette temperature detection device further includes a controller, a display, and other components, which are not shown in the figure. According to requirements of focusing or requirements on an overall volume of the cigarette temperature detection device, a third cylindrical convex lens T3, a fourth cylindrical convex lens T4, etc. may also be provided. Generally, if there are many cylindrical convex lenses used, the overall volume of the cigarette temperature detection device can be reduced, however, this will lead to inaccurate temperature measurement.

The inner shell Kn of the cigarette channel is made of polycarbonate (PC) that transmits the infrared ray. The first cylindrical convex lens T1 and the second cylindrical convex lens T2 are 8-14 μm silicon lenses. The cylindrical grating is a special grating for an infrared imager. The cylindrical infrared detector adopts an amorphous silicon photoresistor. The outer shell Kw of the cigarette channel is made of stainless steel.

The present disclosure further provides a cigarette temperature detection method, which uses the cigarette temperature detection device and includes the following steps:

A cigarette output by a cigarette gun of a cigarette roller is inserted into the inner shell Kn of the cigarette channel. The cylindrical convex lenses focus the infrared ray on the circumferential surface of the cigarette. The cylindrical grating S isolates interfering light and projects the 5-10 μm infrared ray onto the cylindrical infrared detector D to form a focus ring. Multiple temperature measurement points are evenly taken on the focus ring, and an average temperature is acquired through processing.

The processing is performed as follows. The uniform, multi-point temperature measurement is carried out on a 360° ring line on the circumferential surface of the freshly rolled cigarette output by the cigarette gun of the cigarette roller. The average temperature of the ring line on the circumferential surface of the cigarette is calculated by:

$$Taverage = K1 + \left(K2 \times \sum_{1}^{n} Ti\right) / n,$$

where Taverage denotes the average temperature of the ring line on the circumferential surface of the cigarette; n denotes a count of the temperature measurement points; Ti denotes the temperature of each temperature measurement point; K1 denotes a temperature correction coefficient; and K2 denotes a weight correction coefficient.

The cigarette temperature detection device measures the temperature of the entire circumferential surface of the cigarette that is transported continuously at a constant speed in a period of time through the cylindrical infrared detector D, which is in the form of a continuous focus ring. The ring line of the focus ring selected for temperature measurement has a frequency of not less than 1 frame per 12 seconds. Through the processing, a continuous temperature curve is derived, which shows the temperature of the entire circumferential surface of the continuous cigarette in a period of time.

Embodiment 1

The cigarette temperature detection method uses the cigarette temperature detection device and includes the following steps:

A cigarette output by the cigarette gun of the cigarette roller is inserted into the inner shell Kn of the cigarette channel, where the cigarette has a diameter of 7.7 mm. Two cylindrical convex lenses focus the infrared ray on the circumferential surface of the cigarette, and the cylindrical grating (S) isolates interfering light. The 10 μm infrared ray is projected onto the cylindrical infrared detector (D) to form a focus ring. Multiple temperature measurement points are evenly taken on the focus ring, and a temperature is derived after processing, that is, the average temperature of a ring line on the circumferential surface of the cigarette.

The cigarette continuously is transported through the inner shell (Kn) of the cigarette channel at a constant speed, and the cigarette temperature detection device measures the temperature of the entire circumferential surface of the cigarette that is transported continuously within 355 seconds through the cylindrical infrared detector D, which is in the form of a continuous focus ring. A ring line of the focus ring with a frequency of 1 frame per 6 seconds is selected for temperature measurement, and a continuous temperature curve is derived through processing, that is, the temperature of the entire circumferential surface of the continuous cigarette that is transported within 355 s, as shown in FIG. 4.

Figure 4:
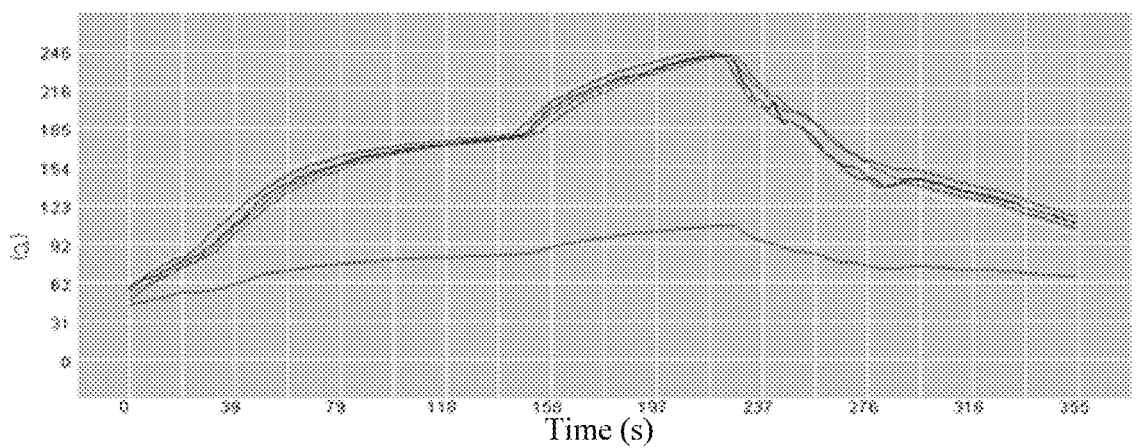
FIG. 4 shows planar imaging-based temperature curves of an entire circumferential surface of a cigarette that is continuously transported in 355 seconds according to an embodiment of the present disclosure.

FIG. 4 shows six curves, including two sets of temperature curves and two measured temperature curves of two heaters of a cigarette roller, an average curve of the above four temperature curves, and a cigarette temperature curve, and the bottom curve is the cigarette temperature curve, that is, the temperature curve of the entire circumferential surface of the continuous cigarette.

It can be seen from FIG. 4 that the temperature of the entire circumferential surface of the continuous cigarette is not uniform. The cigarette temperature detection device of the present disclosure can comprehensively reflect the temperature distribution on the entire circumferential surface of the continuous cigarette. The infrared planar imaging thermometer in the prior art can only detect the temperature of a part of the surface of the cigarette. Therefore, the detection of the circumferential surface temperature is inaccurate, and the temperature distribution of the entire circumferential surface of the continuous cigarette that is transported within a period of time is inaccurate.

The above described are only specific embodiments of the present disclosure and are not intended to limit the present disclosure. Those skilled in the art can make modifications and improvements to the specific embodiments of the present disclosure without departing from the basic idea of the present disclosure, but such modifications and improvements are all within the protection scope of the present disclosure.

What is claimed is:

1. A cigarette temperature detection device comprising multiple cylindrical convex lenses, wherein each of the cylindrical convex lenses has a thicker central wall between two thinner end walls formed by rotating along a parallel line at a predetermined distance around a long axis of an elliptical-like section resulting from cutting the circular convex lens by a plane perpendicular to a centerline.

2. The cigarette temperature detection device according to claim 1, wherein the multiple cylindrical convex lenses are two or more cylindrical convex lenses coaxially nested together; and each of the cylindrical convex lenses is a biconvex lens or a planoconvex lens with a radius of curvature of 2-60 mm.

3. The cigarette temperature detection device according to claim 2, wherein the multiple cylindrical convex lenses are three cylindrical convex lenses, comprising a first cylindrical convex lens, a second cylindrical convex lens, and a third cylindrical convex lens arranged from inside to outside, respectively; and the first cylindrical convex lens, the second cylindrical convex lens, and the third cylindrical convex lens have an inner diameter of 7-15 mm, 15-60, and 20-120 mm, respectively.

4. The cigarette temperature detection device according to claim 1, wherein the cigarette temperature detection device further comprises a cylindrical grating and a cylindrical infrared detector; the cylindrical grating is sleeved outside the multiple cylindrical convex lenses, and the cylindrical infrared detector is sleeved outside the cylindrical grating, wherein the cylindrical infrared detector is located on a focus ring of the multiple cylindrical convex lenses; and the multiple cylindrical convex lenses, the cylindrical grating, and the cylindrical infrared detector are coaxial.

5. The cigarette temperature detection device according to claim 4, wherein the cylindrical grating has an inner diameter that is 1 mm or more larger than an outer diameter of an outermost cylindrical convex lens; and the cylindrical infrared detector has an inner diameter that is 1 mm or more larger than an outer diameter of the cylindrical grating.

6. The cigarette temperature detection device according to claim 4, wherein the cylindrical infrared detector is configured to use a 5-10 μm infrared ray for a temperature measurement.

7. The cigarette temperature detection device according to claim 4, wherein the cigarette temperature detection device further comprises a cigarette channel comprising an inner shell and an outer shell; the inner shell of the cigarette channel is nested inside an innermost cylindrical convex lens and is coaxial with the cylindrical convex lenses, the cylindrical grating, and the cylindrical infrared detector; and the outer shell of the cigarette channel surrounds the cylindrical infrared detector.

8. The cigarette temperature detection device according to claim 7, wherein the cylindrical convex lenses and the inner shell of the cigarette channel are made by a material selected from the group consisting of far-infrared quartz glass, infrared-permeable polycarbonate, transparent acrylic, other transparent resin, and 8-14 μm silicon lens; wherein the cylindrical grating is a special grating for an infrared imager, and the cylindrical infrared detector is made of amorphous silicon.

9. A cigarette temperature detection method, using the cigarette temperature detection device of claim 1, comprising:
  inserting a cigarette output by a cigarette gun of a cigarette roller into an inner shell of a cigarette channel; focusing, by the cylindrical convex lenses, an infrared ray on a 360° ring line on a circumferential surface of the cigarette; isolating, by a cylindrical grating, interfering lights, and projecting a 5-10 μm infrared ray onto a cylindrical infrared detector to form a focus ring; taking multiple temperature measurement points evenly on the focus ring; and acquiring an average temperature of the 360° ring line on the circumferential surface of the cigarette; and
  measuring, by the cylindrical infrared detector of the cigarette temperature detection device, a temperature of an entire circumferential surface of a cigarette that is transported continuously at a constant speed in a period of time, in the form of a continuous focus ring; selecting a ring line of the continuous focus ring with a frequency of not less than 1 frame per 12 seconds for a temperature measurement; acquiring a continuous average temperature curve showing the temperature of the entire circumferential surface of the cigarette in the period of time.

10. The cigarette temperature detection method according to claim 9, wherein the multiple cylindrical convex lenses are two or more cylindrical convex lenses coaxially nested together; and each of the cylindrical convex lenses is a biconvex lens or a planoconvex lens with a radius of curvature of 2-60 mm.

11. The cigarette temperature detection method according to claim 10, wherein the multiple cylindrical convex lenses are three cylindrical convex lenses, comprising a first cylindrical convex lens, a second cylindrical convex lens, and a third cylindrical convex lens arranged from inside to outside, respectively; and the first cylindrical convex lens, the second cylindrical convex lens, and the third cylindrical convex lens have an inner diameter of 7-15 mm, 15-60, and 20-120 mm, respectively.

12. The cigarette temperature detection method according to claim 9, wherein the cigarette temperature detection device further comprises the cylindrical grating and the cylindrical infrared detector; the cylindrical grating is sleeved outside the multiple cylindrical convex lenses, and the cylindrical infrared detector is sleeved outside the cylindrical grating, wherein the cylindrical infrared detector is located on the focus ring of the multiple cylindrical convex lenses; and the multiple cylindrical convex lenses, the cylindrical grating, and the cylindrical infrared detector are coaxial.

13. The cigarette temperature detection method according to claim 12, wherein the cylindrical grating has an inner diameter that is 1 mm or more larger than an outer diameter of an outermost cylindrical convex lens; and the cylindrical infrared detector has an inner diameter that is 1 mm or more larger than an outer diameter of the cylindrical grating.

14. The cigarette temperature detection method according to claim 12, wherein the cylindrical infrared detector is configured to use the 5-10 μm infrared ray for a temperature measurement.

15. The cigarette temperature detection method according to claim 12, wherein the cigarette temperature detection device further comprises the cigarette channel comprising an inner shell and an outer shell; the inner shell of the cigarette channel is nested inside an innermost cylindrical convex lens and is coaxial with the cylindrical convex lenses, the cylindrical grating, and the cylindrical infrared detector; and the outer shell of the cigarette channel surrounds the cylindrical infrared detector.

16. The cigarette temperature detection method according to claim 15, wherein the cylindrical convex lenses and the inner shell of the cigarette channel are made by a material selected from the group consisting of far-infrared quartz glass, infrared-permeable polycarbonate, transparent acrylic, other transparent resin, and 8-14 μm silicon lens; wherein the cylindrical grating is a special grating for an infrared imager, and the cylindrical infrared detector is made of amorphous silicon.

* * * * *